(12) United States Patent
Starnes, Jr. et al.

(10) Patent No.: US 7,718,725 B2
(45) Date of Patent: May 18, 2010

(54) SMOKE AND FIRE INHIBITORS FOR PVC

(75) Inventors: William H. Starnes, Jr., Williamsburg, VA (US); Robert D. Pike, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 286 days.

(21) Appl. No.: 11/761,173

(22) Filed: Jun. 11, 2007

(65) Prior Publication Data

US 2007/0293616 A1   Dec. 20, 2007

Related U.S. Application Data

(60) Provisional application No. 60/804,976, filed on Jun. 16, 2006.

(51) Int. Cl.
*C08K 3/22* (2006.01)
(52) U.S. Cl. .................................. 524/413; 524/568
(58) Field of Classification Search .............. 524/413, 524/568
See application file for complete search history.

(56) References Cited

U.S. PATENT DOCUMENTS

| | | | |
|---|---|---|---|
| 4,053,455 A | 10/1977 | Kroenke | |
| 4,988,751 A | 1/1991 | Chambers | |
| 6,355,277 B1 | 3/2002 | Day | |

OTHER PUBLICATIONS

Starnes et al., Polymeric Materials Sci. and Eng., 91 215-217 (2004).*
Starnes, Jr., William H., et al., "Copper-Containing Additives for the Fire Retardance and Smoke Suppression of Poly(vinyl chloride)", Polymeric Materials Science and Engineering; 91 (2004), pp. 215-217.
Li, Bin, et al., "Effect of Cuprous Oxide in Combination with Molybdenum Trioxide on Smoke Suppression in Rigid Poly(vinyl chloride)", Journal of Vinyl & Additive Technology; 7 (2001), pp. 37-42.
Starnes, Jr., William H., et al., "Cone calorimetric study of copper-promoted smoke suppression and fire retardance of poly(vinyl chloride)", Polymer Degradation and Stability; 82 (2003), pp. 15-24.
Pike, Robert D., et al., "Low-Valent Metals as Reductive Cross-Linking Agents: A New Strategy for Smoke Suppression of Poly(vinyl chloride)", Macromolecules; 30 (1997), pp. 6957-6965.
Starnes, Jr., William H., et al., "Smoke Suppression and Fire Retardance of Poly(vinyl chlordie) by Metal-Based Additives: Progress and Prognosis", Proceedings, 32nd Annual Conference of the North American Thermal Analysis Society; Williamsburg, VA, Oct. 2004.

* cited by examiner

*Primary Examiner*—Robert D. Harlan
(74) *Attorney, Agent, or Firm*—Jason P. McDevitt

(57) ABSTRACT

We describe novel compositions and methods for reducing fire and smoke hazards associated with rigid and flexible PVC. Cone calorimetry studies have identified several copper additives that are highly effective as combustion inhibitors for PVC. Mixed-metal oxides of copper(II) are especially attractive in this regard, some of which are strongly synergistic for smoke suppression when they are combined, in particular $CuTi_3O_7$ and $Cu_3(MoO_4)_2(OH)_2$. These novel combinations are useful for PVC applications wherein color is not of primary importance.

4 Claims, No Drawings

SMOKE AND FIRE INHIBITORS FOR PVC

CROSS-REFERENCE TO RELATED APPLICATIONS

This application claims priority to U.S. Provisional Application No. 60/804,976, filed Jun. 16, 2006.

STATEMENT REGARDING FEDERALLY SPONSORED RESEARCH OR DEVELOPMENT

This invention was made with government support under Grant No. 9983374 awarded by NSF. The government has certain rights in the invention.

BACKGROUND OF THE INVENTION

For commercial polymers, the problems of flame and smoke are of tremendous importance. In particular, poly(vinyl chloride) (PVC) is a high-volume plastic that is inherently nonflammable and yet gives rise to both smoke and flame during fires. The generally accepted mechanism for the combustion of PVC involves dehydrochlorination that produces polyene segments that cyclize and then pyrolyze to generate volatile aromatic hydrocarbons. These hydrocarbons undergo vapor-phase combustion that gives rise to smoke and adds enthalpy to the combustion process (R. D. Pike et al., *Macromolecules* (1997), 30, 6957).

A new strategy, based on reductive coupling, has been introduced to interrupt the process of dehydrochlorination in PVC (W. H. Starnes, Jr. et al., *Polym. Degrad. Stab.* (2003), 82, 15). In dehydrochlorinating PVC, one of the polyene termini is generally recognized as being an allylic chloride moiety. Model-compound studies have shown that allylic chloride molecules can be reductively coupled to form new carbon-carbon bonds through the use of freshly reduced, high-surface-area metal films or powders. Because of its relative stability in reduced states, copper is a very active reductive coupling promoter.

In an effort to identify suitable copper-based precursor complexes that could be used as PVC additives, both copper (I) complexes and copper(II) complexes have been studied. The relative advantages of Cu(I) are its very facile reduction, its limited thermal stability, and particularly its lack of color. However, Cu(I) complexes often are too unstable to survive the requisite processing conditions. Thus, during PVC processing, many of these substances undergo partial decomposition, resulting in undesirable color and potentially impairing mechanical properties. On the other hand, Cu(II) salts are highly stable and generally would not be expected to suffer breakdown during processing or compounding. Unfortunately, all Cu(II) salts are colored, limiting their potential application in industrial processes.

Fire retardants and smoke suppressants are widely used in PVC formulations, and many different compounds are used for this purpose. In U.S. Pat. No. 4,053,455, Kroenke describes the use of amine molybdates as smoke suppressants in PVC polymers. One of the most commercially recognized materials for smoke suppression in PVC is ammonium octamolybdate (AOM). In U.S. Pat. No. 6,355,277, Day describes methods for improving smoke suppression in PVC formulations by incorporation into the polymer of (1) a complex of a cuprous halide and a phosphite, and (2) an amine molybdate which contains no residual molybdenum trioxide.

Nevertheless, fire and smoke hazards remain substantial, and there is a need for improved fire retardants and smoke suppressants.

BRIEF SUMMARY OF THE INVENTION

We describe novel compositions and methods for reducing fire and smoke hazards associated with rigid and flexible PVC. Cone calorimetry studies have identified several copper additives that are highly effective as combustion inhibitors for PVC. Mixed-metal oxides of copper(II) are especially attractive in this regard, and some of them are synergistic as combustion inhibitors when they are combined. In particular, combinations of $Cu_3(MoO_4)_2(OH)_2$ and $CuTi_3O_7$ demonstrate tremendous efficacy as combustion inhibitors, surpassing the efficacy of either mixed metal oxide when used alone, and also demonstrating superiority relative to combustion inhibitors that are used commercially. These combinations are particularly useful for PVC applications wherein color is of low importance.

BRIEF DESCRIPTION OF THE DRAWINGS

Not applicable.

DETAILED DESCRIPTION OF THE INVENTION

As used herein, each of the following terms has the meaning associated with it as described below.

The articles "a" and "an" are used herein to refer to one or to more than one (i.e., to at least one) of the grammatical objects of the article. By way of example, "an element" means one element or more than one element.

A "combustion inhibitor", as used herein, refers to a compound that suppresses smoke and/or retards fire when incorporated into a chlorine-containing polymer at a weight ratio of between 1 and 20 parts combustion inhibitor per 100 parts polymer. A "synergistic mixture", as used herein, refers to a mixture of combustion inhibitors that, when incorporated into a chlorine-containing polymer, reduces smoke and/or suppresses fire, as measured by cone calorimetry, to an extent greater than would be predicted from additive effects. For example, if combustion inhibitor x at concentration c reduces TSR (total smoke released) by 500, and combustion inhibitor y at concentration c reduces TSR by 200, then the expected additive value of a mixture of x and y, each with concentrations of c/2, would yield an expected reduction in TSR of 350 [i.e., (500+200)/2]. If the actual reduction in TSR is found to be significantly greater than 350, then said mixture of combustion inhibitors would be a synergistic mixture.

The polymers utilized in the present invention include any organic chlorine-containing polymers or resins in which the chlorine is attached directly to a carbon atom. Polymers and/or monomers thereof useful to the present invention include, but are not limited to, poly(vinyl chloride) (PVC), poly(vinylidene chloride), chlorinated poly(vinyl chloride), chlorinated polyethylene, chlorinated natural or synthetic rubber, polychloroprene, rubber hydrochloride, or chlorinated polystyrene, and combinations and copolymers thereof. The molecular weight of such polymers can vary over a wide range, and they generally have a number average molecular weight of from about 5,000 to about 1,000,000, or from about 10,000 to 100,000 for PVC. Such polymers can contain the combustion inhibitors of the present invention, as well as other additives commonly used in the art including but not limited to plasticizers, stabilizers, colorants, lubricants, extenders, impact modifiers, fillers, antioxidants, ultraviolet light absorbing agents, and densifying agents.

The above noted chlorine-containing polymers are made from monomers such as vinyl chloride, vinylidene chloride, and the like; or are copolymers made from a mixture of monomers comprising, desirably, at least about 70% by weight of vinyl chloride, based on the total monomer weight. Examples of the copolymers include those made from vinyl chloride and from about 1 to about 30% of a copolymerizable ethylenically unsaturated monomer such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate, and chloroallylidene diacetate. Typical copolymers include vinyl chloride-vinyl acetate (e.g., 96:4 sold commercially as VYNW), vinyl chloride-vinyl acetate (e.g., 87:13), vinyl chloride-vinyl acetate-maleic anhydride (e.g., 86:13:1), vinyl chloride-vinylidene chloride (e.g., 95:5), vinyl chloride-diethyl fumarate (e.g., 95:5), and vinyl chloride-2-ethylhexyl acrylate (e.g., 80:20).

In some preferred embodiments, the polymer is PVC. Preferred copolymers include vinyl chloride-vinyl acetate, vinyl chloride-vinylidene chloride, and other vinyl chloride copolymers.

The combustion inhibitors of the present invention can be added to or blended with the above described polymers in any suitable amount, generally from about 0.1 to about 100 parts by weight combustion inhibitors per 100 total parts by weight of all of the one or more polymers or copolymers, depending on the desired properties of the final product such as being plasticized. The combustion inhibitors of the present invention can be incorporated into the resin by any one of many known methods that provide for uniform distribution of additives throughout resin compositions (e.g., mixing in an appropriate mill, mixer, or Banbury apparatus). Depending on the end use, further additives, known to the art and to the literature or to those of ordinary skill in the art, can be added in suitable amounts to the above-noted polymers, including plasticizers, stabilizers and costabilizers, lubricants, extenders, impact modifiers, fillers, pigments, antioxidants, dyes, ultraviolet light absorbing agents, densifying agents, and the like.

Numerous copper salt-containing combinations are useful according to the compositions and methods of the present invention. Included in such useful methods and compositions are PVC formulations containing a mixture of copper combustion inhibitors and additional combustion inhibitors that do not have copper, such as AOM and $Sb_2O_3$.

As a result of the rising cost of molybdenum, which is an important component of commercially important combustion inhibitors for PVC such as AOM, there is a desire to find effective combustion inhibitors that are less expensive. Several mixed-metal oxides of copper that are effective as combustion inhibitors are described herein. There is substantial variation in the prices of these mixed-metal oxides of copper. Of the mixed-metal oxides of copper that were tested, $Cu_3(MoO_4)_2(OH)_2$ appears to be the most effective as a combustion inhibitor when used alone, based on comparisons across numerous tests, although that determination is subject to the relative importance one ascribes to each test. However, $Cu_3(MoO_4)_2(OH)_2$ is relatively expensive, whereas $CuTi_3O_7$ is relatively inexpensive. Surprisingly, combinations of $Cu_3(MoO_4)_2(OH)_2$ and $CuTi_3O_7$ are synergistic mixtures that demonstrate tremendous efficacy as combustion inhibitors, surpassing the efficacy of either mixed-metal oxide when used alone, and also demonstrating superiority relative to combustion inhibitors that are used commercially.

Herein we disclose the use of combinations of $Cu_3(MoO_4)_2(OH)_2$ and $CuTi_3O_7$ as combustion inhibitors. While the combinations in the Examples section comprise mixtures of equivalent masses of two mixed-metal oxides of copper (i.e., each mixed-metal oxide constitutes 50% by weight), the invention described herein contemplates mixtures having any relative concentrations of the mixed-metal oxides of copper, particularly ratios of one mixed-metal oxide of copper to another varying between 5:95 and 95:5 by weight. The invention further contemplates combinations of combustion inhibitors comprising a mixture of three or more combustion inhibitors, wherein $Cu_3(MoO_4)_2(OH)_2$ and $CuTi_3O_7$ comprise two of the combustion inhibitors.

EXAMPLES

The invention is now described with reference to the following examples. These examples are provided for the purpose of illustration only and the invention should in no way be construed as being limited to these examples but rather should be construed to encompass any and all variations which become evident as a result of the teaching provided herein.

The following abbreviations for copper complexes are used in the Examples below:

| Copper Complex | Abbreviation |
|---|---|
| $Cu_3(MoO_4)_2(OH)_2$ | CuMo |
| $CuTi_3O_7$ | CuTi |
| $CuSb_2O_6$ | CuSb |
| $CuSnO_3$ | CuSn |

Plasticized PVC plaques containing copper-based additives were prepared and tested via cone calorimetry. The following parameters were measured by the calorimeter: time to ignition (TTI), i.e., the time elapsed until sustained (>10 s) flaming begins; total smoke released (TSR), i.e., a unitless value indicating the cumulative smoke as determined via laser obscuration; specific extinction area (SEA), i.e., the average smoke produced per unit mass being volatilized; heat release rate (HRR), i.e., the average rate of heat release per unit sample area; mass loss rate (MLR), i.e., the average mass of sample being volatilized per unit time; and effective heat of combustion (EHC), i.e., the average heat released per unit mass being volatilized. Thus, TTI and HRR are measures of flammability, and TSR and SEA are measures of smoke production. The MLR parameter is connected with both flame and smoke, and the EHC is a measure of the efficiency of combustion.

Cone Calorimetry Procedure

Plasticized plaques (100×100×3 mm³) containing PVC (between 30 and 60 g), plasticizer, combustion inhibitors, and optionally other additives were prepared from blends. The cone calorimeter was a Fire Testing Technology instrument. Plaques were burned in the flaming mode with spark ignition according to a standard test procedure (ASTM E 1354), using a heat flux of 50 kW/m² and a horizontal receptacle that allowed samples to be immobilized with a stainless steel grid.

In numerous replicate runs, reproducibilities were found to be within ±10% for all of the properties studied.

Example 1

Preparation of $Cu_3(MoO_4)_2(OH)_2$ and Other Mixed-Metal Oxides of Copper(II)

A 250-mL aqueous solution of $Na_2MoO_4.2H_2O$ (21.6 g, 89.4 mmol) was added dropwise to a 250-mL aqueous solution of $CuSO_4.5H_2O$ (33.5 g, 134 mmol). A pale blue-green precipitate formed immediately. The suspension was refluxed overnight, and the now pale green precipitate was collected by filtration. It was washed in succession with $H_2O$, EtOH, and acetone and vacuum-dried (15.9 g, 29.2 mmol, 65%). Other mixed-metal oxides were prepared similarly.

Example 2

Twelve different PVC formulations were tested via cone calorimetry. All twelve samples used in Example 2 contained the following base formulation:

| Component | Concentration (phr) |
|---|---|
| Oxyvinyl 240F | 100 |
| Halstab H-695 | 7 |
| $Sb_2O_3$ | 3 |
| Micral 9400 | 30 |
| Saniticizer 2148 | 20 |
| Uniplex FRP-45 | 20 |
| Combustion Inhibitor | 5 |

Concentration values are provided in parts per hundred parts resin (phr). Oxyvinyl 240F was used as the PVC resin. Additional additives (Halstab H-695, $Sb_2O_3$, Micral 9400, Saniticizer 2148, and Uniplex FRP-45) were used in all plaques at the same levels. A total of 5 phr of combustion inhibitors was used in each sample. Combustion inhibitors were chosen from single mixed-metal oxides of copper, combinations thereof, and commercial combustion inhibitors Climax AOM A20171 and Climax AOM WA011 GA.

Cone calorimetry was performed on these samples, and the results are presented in Table 1. Data shown are from two separate trials for each formulation, with the exception of sample 2G (50% CuMo, 50% CuSn) for which data on only one sample were obtained.

TABLE 1

Cone Calorimetry Results for Example 2

| ID# | Combustion Inhibitor (5 phr total) | Initial mass (g) | TTI (s) | THR (MJ/m$^2$) | TSR (-) | HRR (kW/m$^2$) | EHC (MJ/kg) | MLR (g/s) | SEA (m$^2$/kg) |
|---|---|---|---|---|---|---|---|---|---|
| 2A | 100% Climax AOM A20171 | 52.3 | 533 | 14.3 | 1213 | 39.4 | 20.5 | 0.017 | 196 |
|  |  | 51.7 | 452 | 14.4 | 1223 | 40.2 | 20.2 | 0.018 | 280 |
| 2B | 100% CuMo | 54.3 | >1200 | 25.4 | 911 | 20.2 | 5.5 | 0.032 | 196 |
|  |  | 53.0 | 522 | 12.4 | 788 | 40.0 | 28.1 | 0.012 | 226 |
| 2C | 100% CuSb | 52.6 | 413 | 10.5 | 1387 | 41.9 | 18.2 | 0.020 | 416 |
|  |  | 55.2 | 433 | 11.0 | 1359 | 43.3 | 16.4 | 0.024 | 304 |
| 2D | 100% CuSn | 53.4 | 347 | 16.9 | 1131 | 66.7 | 20.4 | 0.029 | 375 |
|  |  | 52.0 | 325 | 9.0 | 1036 | 36.8 | 10.5 | 0.031 | 273 |
| 2E | 100% CuTi | 55.5 | 429 | 11.3 | 1539 | 43.0 | 18.3 | 0.021 | 308 |
|  |  | 56.5 | 458 | 11.8 | 1576 | 43.1 | 19.9 | 0.019 | 311 |
| 2F | 50% CuMo 50% CuSb | 54.8 | 551 | 10.3 | 862 | 29.4 | 13.3 | 0.020 | 76 |
|  |  | 55.7 | 514 | 9.6 | 899 | 26.5 | 9.9 | 0.024 | 129 |
| 2G | 50% CuMo 50% CuSn | 53.8 | 396 | 6.7 | 924 | 33.2 | 11.5 | 0.025 | 215 |
| 2H | 50% CuMo 50% CuTi | 55.7 | >1200 | 15.4 | 832 | 11.9 | 3.1 | 0.034 | 167 |
|  |  | 55.0 | >1200 | 22.8 | 912 | 19.8 | 4.8 | 0.035 | 192 |
| 2I | 50% CuSn 50% CuSb | 56.6 | 303 | 13.8 | 1521 | 55.8 | 17.5 | 0.028 | 527 |
|  |  | 56.6 | 332 | 13.5 | 1270 | 52.0 | 17.7 | 0.026 | 387 |
| 2J | 50% CuSb 50% CuTi | 56.7 | 419 | 15.3 | 1466 | 27.6 | 9.8 | 0.025 | 343 |
|  |  | 55.1 | 421 | 16.2 | 1374 | 37.9 | 16.7 | 0.020 | 237 |
| 2K | 50% CuSn 50% CuTi | 55.9 | 419 | 15.0 | 1194 | 39.9 | 18.8 | 0.019 | 325 |
|  |  | 57.3 | 431 | 12.0 | 1278 | 39.9 | 19.4 | 0.018 | 386 |
| 2L | 100% Climax AOM WA011GA | 55.4 | 448 | 12.7 | 1578 | 39.5 | 21.6 | 0.016 | 276 |
|  |  | 54.0 | 431 | 10.3 | 1506 | 35.1 | 21.5 | 0.014 | 202 |

The cone calorimetry data for the mixed-metal copper oxides were compared with the data for the two commercial AOM additives in samples 2A and 2L. The plaques with the mixture of CuMo and CuTi failed to ignite in either of the duplicate burns after 1200 s, which is the longest time that the cone calorimetry computer program could record.

While $CuTi_3O_7$ is somewhat effective when used in the absence of additional combustion inhibitors, in particular yielding good numbers on the THR test, its overall performance as a combustion inhibitor is inferior to those of both $Cu_3(MoO_4)_2(OH)_2$ and the commercial AOM formulations. In particular, the $CuTi_3O_7$ formulations performed poorly in the following tests: TTI, TSR, HRR, and SEA. However, when $CuTi_3O_7$ was combined with $Cu_3(MoO_4)_2(OH)_2$, and the resulting formulations were tested for combustion inhibitor properties, it was apparent that the combination produced synergistic benefits for all of these properties that were previously deficient. In other words, for each of these tests wherein $CuTi_3O_7$ was deficient on its own as a combustion inhibitor, the scores of the CuMo/CuTi combinations were better than would have been predicted by averaging the scores obtained when the mixed-metal oxides were tested separately. In fact, for TTI, HRR, and SEA, the test scores were better than those of either mixed-metal oxide system when tested alone in the absence of a combustion co-inhibitor, and also superior to those of the commercial standards. Accordingly, combinations of $Cu_3(MoO_4)_2(OH)_2$ and $CuTi_3O_7$ have synergistic performance benefits as combustion inhibitors for PVC.

All publications and patent applications mentioned in the specification are indicative of the level of those skilled in the art to which this invention pertains. Although the foregoing invention has been described in some detail by way of illustration and example for purposes of clarity of understanding, it will be obvious that certain changes and modifications may be practiced within the scope of the representative embodiments of these concepts presented below. The appended claims are intended to be construed to include all such embodiments and equivalent variations.

We claim:

1. A polymer composition comprising:
   (i) a chlorine-containing polymer, and
   (ii) a mixture of combustion inhibitors comprising $CuTi_3O_7$ and $Cu_3(MoO_4)_2(OH)_2$.

2. The polymer composition of claim 1, wherein the concentration of said combustion inhibitors is from about 1 to about 20 parts by weight per 100 parts by weight of said polymer.

3. The polymer composition of claim 1, wherein said polymer is PVC.

4. The polymer composition of claim 1, wherein said composition includes one or more polymer additives selected from the group consisting of plasticizers, stabilizers and costabilizers, lubricants, extenders, impact modifiers, fillers, pigments, antioxidants, dyes, ultraviolet light absorbing agents, and densifying agents.

* * * * *